(12) United States Patent
Murata

(10) Patent No.: US 9,256,814 B2
(45) Date of Patent: Feb. 9, 2016

(54) IMAGE PROCESSING APPARATUS, IMAGE PROCESSING METHOD AND COMPUTER-READABLE STORAGE DEVICE

(71) Applicant: Brother Kogyo Kabushiki Kaisha, Nagoya (JP)

(72) Inventor: Mareyuki Murata, Kuwana (JP)

(73) Assignee: Brother Kogyo Kabushiki Kaisha, Nagoya-Shi (JP)

(*) Notice: Subject to any disclaimer, the term of this patent is extended or adjusted under 35 U.S.C. 154(b) by 0 days.

(21) Appl. No.: 14/499,361

(22) Filed: Sep. 29, 2014

(65) Prior Publication Data

US 2015/0092238 A1 Apr. 2, 2015

(30) Foreign Application Priority Data

Sep. 30, 2013 (JP) ................................. 2013-203147

(51) Int. Cl.
*G06K 15/02* (2006.01)
*G06F 3/12* (2006.01)

(52) U.S. Cl.
CPC ............ *G06K 15/1869* (2013.01); *G06F 3/125* (2013.01); *G06F 3/1219* (2013.01); *G06F 3/1244* (2013.01); *G06F 3/1284* (2013.01); *G06K 15/181* (2013.01)

(58) Field of Classification Search
CPC ... G06F 3/1297; G06F 3/1219; G06F 3/1244; G06F 3/125; G06F 3/1284; H04N 1/233; H04N 1/2369; H04N 2201/0082; G06K 15/1869; G06K 15/181
USPC ........................................................ 358/1.18
See application file for complete search history.

(56) References Cited

U.S. PATENT DOCUMENTS

2009/0168107 A1* 7/2009 Takeuchi et al. ............. 358/1.18

FOREIGN PATENT DOCUMENTS

| JP | 08-340439 A | 12/1996 |
| JP | 2000-025297 A | 1/2000 |
| JP | 2013-131874 A | 7/2013 |

* cited by examiner

*Primary Examiner* — Iriana Cruz
(74) *Attorney, Agent, or Firm* — Burr & Brown, PLLC

(57) ABSTRACT

A non-transitory computer-readable recording medium storing instructions which, when executed by a computer, provide processes including (1) receiving a print job including draw commands, (2) generating original image data representing original image, the original image including a plurality of objects, the objects being generated in respective rectangular areas determined by the draw commands, the original image being constituted by a plurality of lines each represented by each line data, (3) determining whether each line data is subjected to be printed across the respective rectangular area, (4) determining the line data is object-including line data when the line data is subjected to be printed across the respective rectangular area, (5) determining the line data is object-excluding line data when the line data is not subjected to be printed across the respective rectangular area, and (6) generating print data by eliminating the object-excluding line data from the original image data.

15 Claims, 9 Drawing Sheets

IMAGE PROCESSING APPARATUS, IMAGE PROCESSING METHOD AND COMPUTER-READABLE STORAGE DEVICE

CROSS-REFERENCE TO RELATED APPLICATION

This application claims priority under 35 U.S.C. §119 from Japanese Patent Applications No. 2013-203147 filed on Sep. 30, 2013. The entire subject matter of the application is incorporated herein by reference.

BACKGROUND

1. Technical Field

The present disclosures relate to an image processing apparatus, an image processing method and a non-transitory computer-readable recording medium storing computer-executable instructions realizing the image processing method. More specifically, the disclosures relate to an image processing apparatus configured to generate print data by deleting predetermined lines from an image represented by image data. The disclosures also relate to a method of realizing such an image processing, and the computer-readable recording medium storing instructions instructing a processor to execute such a method.

2. Related Art

Conventionally, there has been known an image processing apparatus having a blank line eliminating function, which is a function of generating print data based on image data representing an image to be printed with blank lines eliminated therefrom, and moving remaining lines upward. Then, based on the print data generated as above, the image from which blank lines are eliminated is printed. With use of this function, the number of printing sheets can be reduced as unnecessary blank lines are eliminated, and the remaining lines are moved upward. Typically, such a function is realized by detecting one or more continuous blank lines, which include no image (or a part of an image) to be printed, within an image and eliminating the detected blank line(s) when the print data is generated.

SUMMARY

There is a case where an object having a white dot, line or area is to be printed. In the conventional art described as above, such an object having white portion(s) are detected as an area having no image and eliminated although it is a part of white image.

The present disclosures provide an improved image processing device with which the unintentional elimination of blank lines can be prevented. The present disclosures also relate to a method employed in such an apparatus, and a computer-readable recording medium containing instructions realizing such a method.

According to aspects of the disclosures, there is provided a non-transitory computer-readable recording medium storing instructions which, when executed by a computer, provide processes including (1) receiving a print job including draw commands, (2) generating original image data representing original image, the original image including a plurality of objects, the objects being generated in respective rectangular areas determined by the draw commands, the original image being constituted by a plurality of lines each represented by each line data, (3) determining whether each line data is subjected to be printed across the respective rectangular areas, (4) determining the line data is object-including line data when the line data is subjected to be printed across the respective rectangular areas, (5) determining the line data is object-excluding line data when the line data is not subjected to be printed across the respective rectangular areas, and (6) generating print data by eliminating the object-excluding line data from the original image data.

According to aspects of the disclosures, there is also provided an information processing apparatus, which is provided with a communication unit configured to communicate with a printing device, and a controller. The controller is configured to provide processes including, (1) receiving a print job including draw commands, (2) generating original image data representing original image, the original image including a plurality of objects, the objects being generated in respective rectangular areas determined by the draw commands, the original image being constituted by a plurality of lines each represented by each line data, (3) determining whether each line data is subjected to be printed across the respective rectangular areas, (4) determining the line data is object-including line data when the line data is subjected to be printed across the respective rectangular areas, (5) determining the line data is object-excluding line data when the line data is not subjected to be printed across the respective rectangular areas, and (6) generating print data by eliminating the object-excluding line data from the original image data.

According to aspects of the disclosures, there is also provided a method of generating print data based on original image data which includes (1) receiving a print job including draw commands, (2) generating original image data representing original image, the original image including a plurality of objects, the objects being generated in respective rectangular areas determined by the draw commands, the original image being constituted by a plurality of lines each represented by each line data, (3) determining whether each line data is subjected to be printed across the respective rectangular areas, (4) determining the line data is object-including line data when the line data is subjected to be printed across the respective rectangular areas, (5) determining the line data is object-excluding line data when the line data is not subjected to be printed across the respective rectangular areas, and (6) generating print data by eliminating the object-excluding line data from the original image data.

According to aspects of the disclosure, there is also provided a non-transitory computer-readable recording medium storing instructions which, when executed by a computer, provide processes including (1) receiving a print job including draw commands, (2) generating original image data representing original image, the original image including a plurality of objects, the plurality of objects being generated in respective rectangular areas determined by the draw commands, the original image being constituted by a plurality of lines, each of the plurality of lines being represented by each line data, (3) determining whether each line data is subjected to be printed across the respective rectangular areas, (4) determining the line data is object-including line data when the line data is subjected to be printed across the respective rectangular areas, (5) determining the line data is object-excluding line data when the line data is not subjected to be printed across the respective rectangular areas, (6) determining whether a plurality of successive line data, which are the object-excluding line data, are included in the original image data, (7) determining whether a number of the plurality of successive object-excluding lines being represented by the plurality of successive object-excluding line data is greater than a specific elimination threshold when a plurality of successive object-excluding line data are included in the original image data, (8) determine at least part of the plurality of successive object-excluding lines to be eliminated from the original image data when the number of the plurality of successive object-excluding line data is greater than a specific elimination threshold, and (9) generating print data by eliminating the determined object-excluding line data of the plurality of successive object-excluding lines from the original image data.

BRIEF DESCRIPTION OF THE ACCOMPANYING DRAWINGS

DETAILED DESCRIPTION OF THE ILLUSTRATIVE EMBODIMENT

Hereinafter, a print system 100 according to aspects of an illustrative embodiment will be described with reference to accompanying drawings.

It is noted that various connections are set forth between elements in the following description. It is noted that these connections in general, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, floppy drives, permanent storages, and the like.

<Configuration of Print System>

Figure 1:
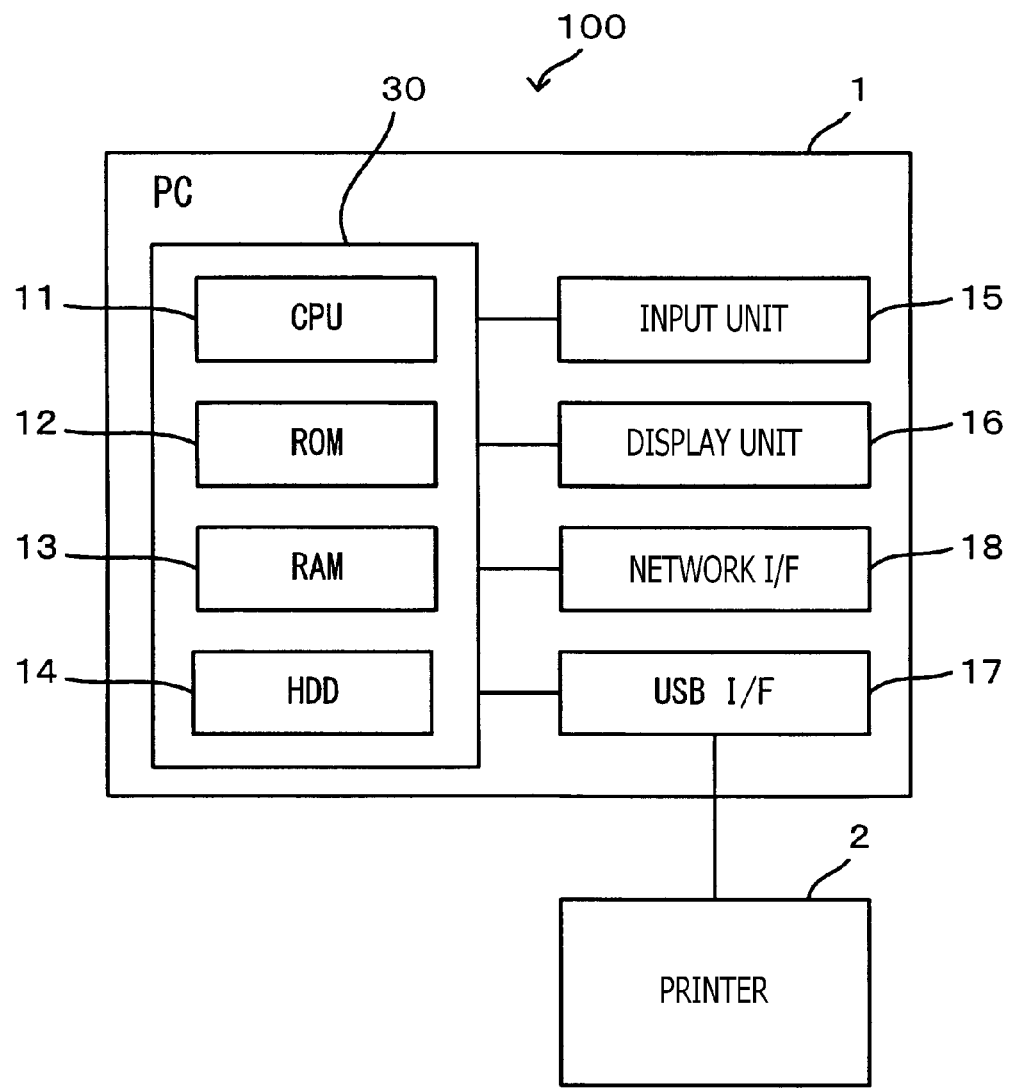
FIG. 1 is a block diagram showing a configuration of a print system according to aspects of an illustrative embodiment.

As shown in FIG. 1, a print system 100 according to aspects of an illustrative embodiment is provided with a printer 2 and a PC (personal computer) 1 configured to control an operation of the printer 2. According to the print system 100, the PC 1 and the printer 2 are connected with a USB (universal serial bus) cable.

It is noted that the number of the printers and/or PCs provided to the print system 100 need not be limited to one, but a plurality of printers 2 and/or PCs 1 may be connected to the print system 100. It is also noted that a connection between the PC 1 and the printer 2 need not be limited to one using the USB cable, but the connection can be made with another serial communication bus cable, a parallel communication cable, a wired LAN (local area network) or a wireless communication path.

The PC 1 has a CPU (central processing unit) 11, a ROM (read only memory) 12 storing a BIOS (basic input/output system) program which is executed by the CPU 11 when the PC 1 is invoked and the like, a RAM (random access memory) 12 which is used as a temporary storage when the CPU 11 executes various processes, and a controller 30 having an HDD (hard disk drive) 14 storing various programs and various pieces of data. It is noted that the term "controller" 30 is used as a collective term including the CPU 11, hardware used to control the PC 1 and the like, and should not be interpreted to a single hardware member in the PC 1.

The PC 1 further has an input unit 14 including a keyboard and a mouse, a display unit 16 including an LCD (liquid crystal display) 16, a USB interface 17 and a network interface 18. The USB interface 17 is hardware used to communicate with an external device connected through a USB cable. The network interface 18 is hardware used to communicate with an external device connected through a LAN cable.

Figure 2:
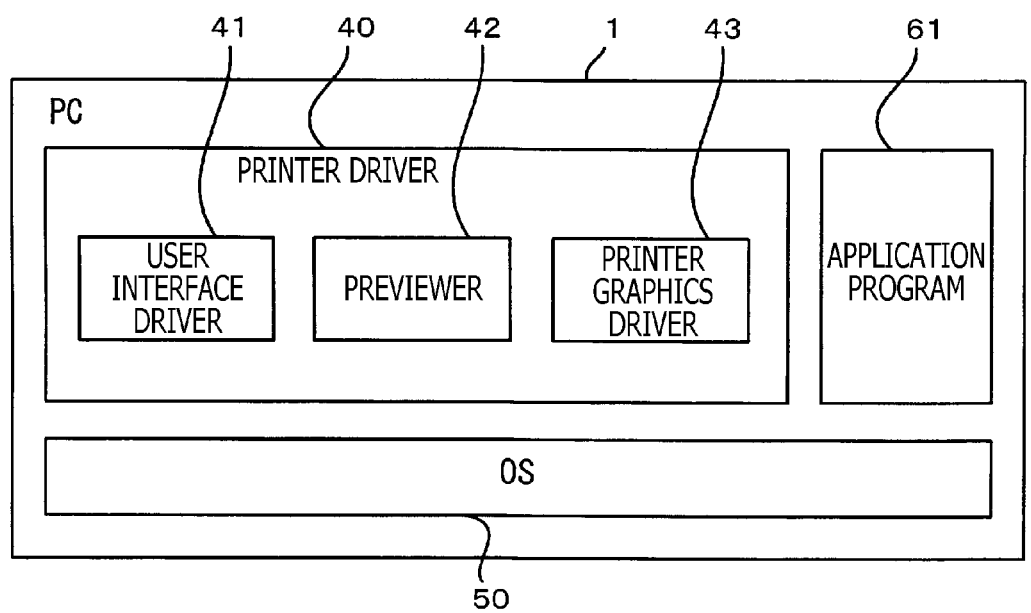
FIG. 2 is a block diagram showing a functional configuration of a program implemented in a PC (personal computer).

As shown in FIG. 2, on the HDD 14, stored are an OS (operating system) 50, application programs 61 (e.g., document generating software, drawing software, spreadsheet software, photographic data editing software, and the like), and a printer driver 40 used to control the printer 2. It is noted that the programs may have been installed to the PC 1 using data stored in a recording medium such as a CD-ROM and the like and/or using data downloaded from a server on a network.

Each of the application programs 61 installed in the PC 1 generally has a function to output a print command to the printer driver 40. The printer driver 40 is configured to generate image data of an original image in response to receipt of the print command from each application. The printer driver 40 then generates print data having a PDL (page description language) format necessary to print an image using the printer 2. The print data generated by the printer driver 40 is transmitted to the printer 2 through the USB interface 17.

According to the illustrative embodiment, the printer 2 is only required to have a function of printing images on sheets. The printer 2 may be configured such that images can be formed in accordance with an electrophotographic image forming method, an inkjet printing method or any other generally employed image forming methods. Further, according to the illustrative embodiment, the printer 2 may be configured to form color images, monochromatic images or both.

The printer driver 40 according to the illustrative embodiment is configured to have a preview function which is a function to form preview data representing a preview image corresponding to an image to be formed on a sheet, and to display the preview image. Further, the printer driver 40 according to the illustrative embodiment has a function of allowing a user to set whether or not to use the preview function.

Specifically, when the preview function is to be used, the printer driver 40 enerates preview data which is image data representing an image subjected to be printed, and invokes the previewer 42. Then, the printer driver 40 causes the previewer 42 to display the preview image based on the preview data. When the print command is input to the previewer 42, the printer driver 40 causes the previewer 42 to generate the print data which is image data for printing, and causes the previewer 42 to transmit the thus generated print data to the printer 2. If the preview function is not used, the printer driver 40 does not generate the preview data. In such a case, the printer driver 40 generates the print data without invoking the previewer 42, and transmits the print data to the printer 2.

It is noted that, according to the illustrative embodiment, the preview function is not a function provided to the application programs 61, but to the printer driver 40. The printer driver 40 may process the image data (e.g., to execute a collective printing such as an n-in-1 printing (i.e., n-up printing), to add a watermark, and the like) when the printer driver 40 generates print data. Such a processing executed by the printer driver 40 cannot be reflected on a preview image provided by an application program 61. In contrast, when the preview is provided by the printer driver 40, all the processings including ones applied by the printer driver 40 can be reflected on the preview image. Accordingly, it is advantageous to generate the preview image with use of the printer driver 40 since the image to be printed on the sheet can be displayed more accurately in comparison with a case where the preview image is provided by the applications 61.

<Configuration of Printer Driver>

Next, a functional configuration of the printer driver 40 will be described with reference to FIG. 2. According to the illustrative embodiment, it is assumed that Microsoft Windows (registered trademark) is implemented as the OS 50 in the PC 1.

The printer driver 40 includes a user interface driver 41 which enables user input for various settings for a print job, the previewer 42 which displays an image to be printed on the display unit 16, and a printer graphics driver 43 which generates print data, preview data or both.

The user interface driver 41 provides a print setting screen enabling the user to set various attributes for a print job. Specifically, with use of the print setting screen, the user can make general settings such as a sheet size, a sheet type, print quality, and an orientation of the sheet. Additionally, according to the illustrative embodiment, the user can set whether or not to use the preview function through the print setting window. The user interface driver 41 further has a function of invoking the previewer 42 when the user sets the preview function to be used.

Figure 3:
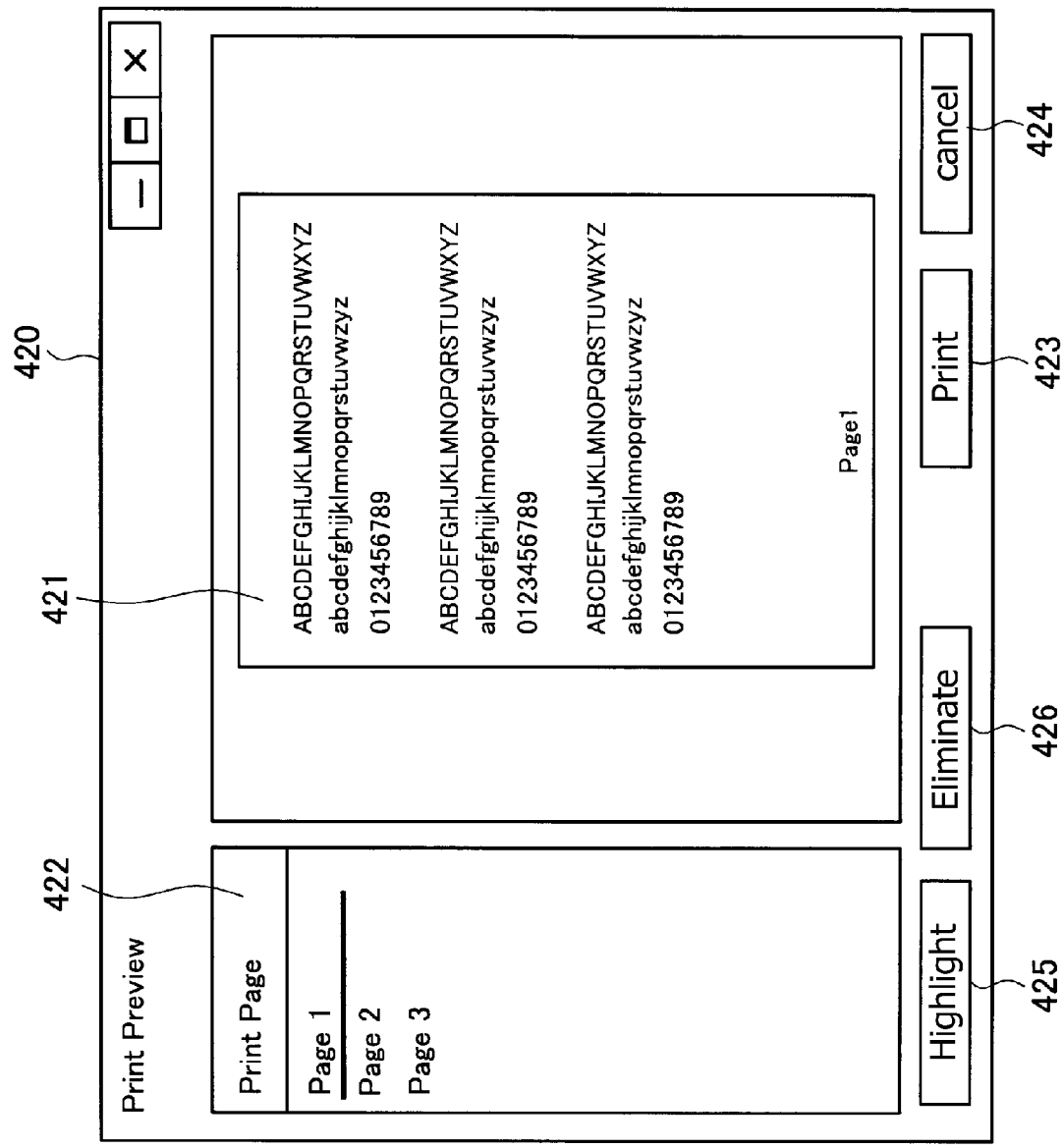
FIG. 3 shows an example of a preview screen according to aspects of the illustrative embodiment.

The previewer 42 displays a preview screen 420 as shown in FIG. 3. The preview screen 420 includes an image area 421 which displays a preview image corresponding to one page of the sheet and reflecting the print settings made by the user through the print setting screen based on the preview data, a page selection area 422 allowing the user to select a page of which the preview image is displayed in the image area 421, a print button 423 acquiring user input of starting a print job, a cancel button 424 for terminating the print job, a highlight button 425 causing the image area 421 to display the image with the blank lines in a highlighted manner, and an eliminate button 426 causing the image area 421 to display the image with eliminating the blank lines.

In the page selection area 422, the page number corresponding to the image currently displayed in the image area 421 is underlined. Accordingly, the user can easily recognize the page number of the image of which the preview image is currently displayed in the image area 421. Further, in the page selection area 422, all the page numbers corresponding to the number of pages of the preview data are displayed. Accordingly, the user can recognize the total number of pages of the images constituting the print job.

When the print button 423 is clicked with the mouse of the input unit 15 (hereinafter, an operation of clicking a displayed button using the mouse will be simply referred to as a "click"), the previewer 42 generates print data corresponding to the preview data representing the preview image currently displayed, and transmits the generated print data to the printer 2. When the cancel button 424 is clicked, the previewer 42 deletes the preview data. After the above process is executed, that is, when the print button 423 or the cancel button 424 is clicked, the previewer 42 terminates its operation.

Figure 4:
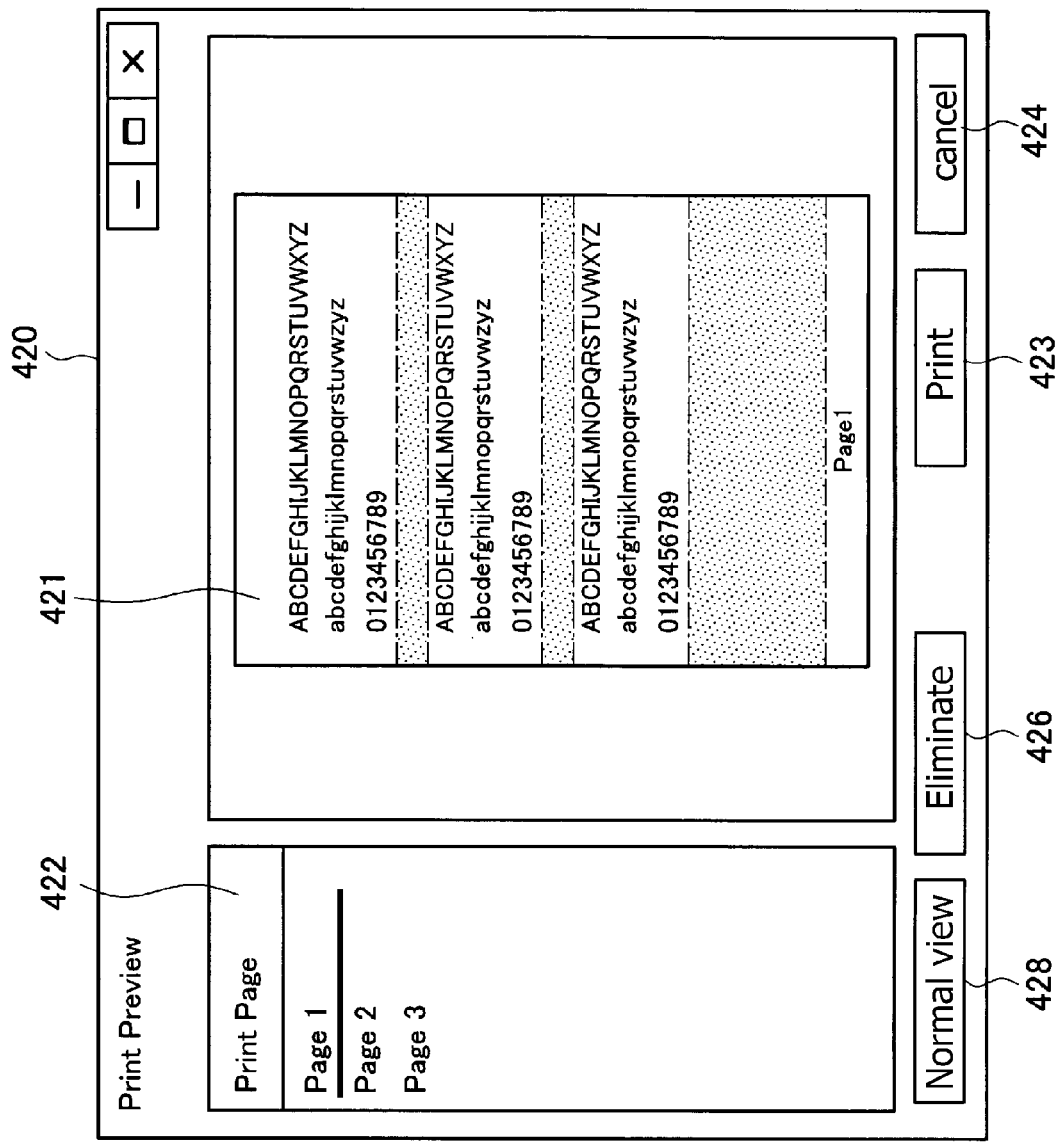
FIG. 4 shows an example of a preview screen where object-excluding lines to be eliminated are highlighted.
Figure 5:
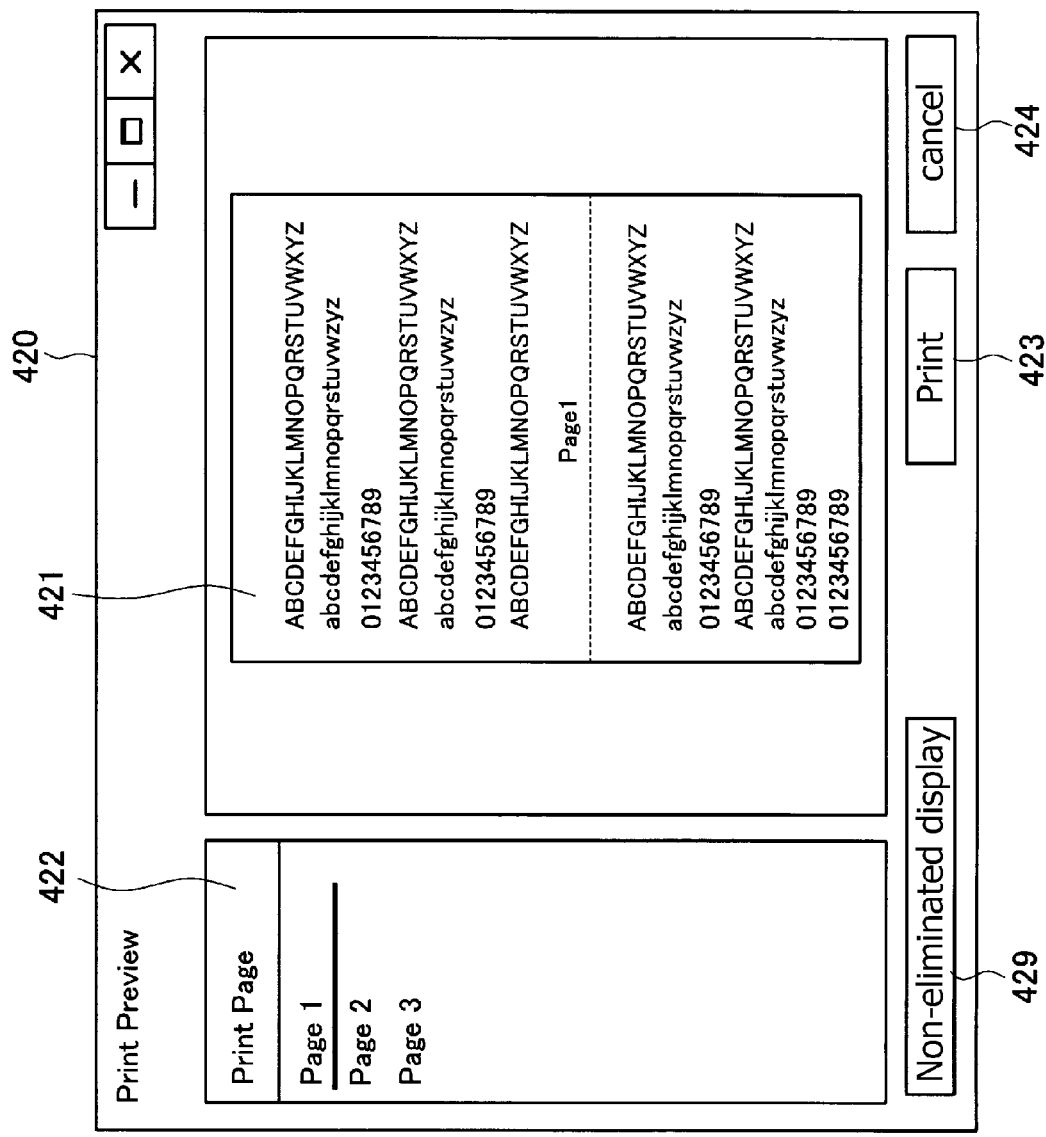
FIG. 5 shows an example of a preview screen where the object-excluding lines have been eliminated.

When the highlight button 425 is clicked, the previewer 42 highlights the blank lines which are subjected to be eliminated on the preview image displayed in the image area 421 as shown in FIG. 4. It is noted that a blank line is a line which does not include any object in which characters, figures or photographs are included, and a predetermined condition is satisfied.

It is noted that any method can be used to emphasize the blank lines and there are no specific requirements for the method to be employed as far as the emphasized lines can be recognized. For example, a background color of the blank lines subjected to be eliminated may have a different color than an area containing lines which will not be eliminated. For example, the background color for the lines which will not be eliminated is white, while the highlighted portions may be displayed in a fluorescent color. According to the illustrative embodiment, a normal view button 428, which is displayed when the highlighted image is being displayed, is clicked, the previewer 42 cancels the highlighted display, that is, the image including the blank lines to be eliminated is displayed without being highlighted.

When the eliminate button 426 is clicked, the previewer 42 eliminates the blank lines subjected to be eliminated from the image subjected to be printed, moves the remaining lines up, and displays the image, of which the blank lines have been eliminated, in the image area 421 (i.e., the eliminated image represented by the image data is displayed). It is noted that the previewer 42 processes the image data to show the above preview image. In the following description, for simplifying the description, an expression such as "displaying preview image data of which the blank lines have been eliminated" will also be used. When a non-elimination button 429, which is displayed when the eliminated image is being displayed, is clicked, the previewer 42 cancels displaying of the eliminated image data.

The printer graphics driver 43 executes processing of the image data subjected to be printed, generation of the preview data for each physical sheet (for each side if duplex printing is performed) based on the processed image data, generation of the print data for each physical sheet based on the processed image data, and the like. It is noted that the processing of the image data includes, for example, addition of the watermark, header and/or footer, enlargement or reduction, rotation, generation of collective image such as 2-in-1 or 4-in-1, which can be set through the print setting screen, as well as elimination of the designated areas (i.e., blank lines) as mentioned before.

The data type of the preview data can be any type as far as the previewer 42 can display the same. According to the illustrative embodiment, the preview data is a BMP (bit map) type data. It is noted that the data type of the preview data can be compressed type data such as JPEG (joint photographic experts group) data. It is also noted that the data type of the print data can be any type if it can be used by the printer 2 for printing. According to the illustrative embodiment, PDL (page description language) data is employed.

<Print Preview Method>

According to the print system 100, both a print preview method, which displays a preview image before printing, and a direct print method, which executes printing without displaying a preview image, can be selected for printing images. The direct print method is a generally known print method and will not be described in this specification for brevity.

When an image is printed in accordance with the print preview method, firstly an application program 61 receives a user's print start instruction, and outputs the print start notification. Then, the OS 50 receives the print start notification from the application program 61 and receives the print command from the application program 61.

Then, the OS 50 outputs a draw command to the printer graphics driver 43 based on the received print command. After outputting the draw command, the OS 50 operates in a standby state until the printer graphics driver 43 responds thereto.

When the printer graphics driver 43 receives the draw command, the printer graphics driver 43 generates image data having the BMP format in accordance with the draw command, and depending on necessity, applies image processing such as rotation and the like to the image data. Further, the image graphics driver 43 generates preview data for the previewer 42 based on the image data as processed. The preview data includes data representing the image to be printed and page number information. Further, the printer graphics driver 43 generates first preview data which corresponds to the image data generated in accordance with the draw command, and second preview data which corresponds to the image data in which the blank lines have been eliminated. In the following description, the first preview data and the second preview data will be referred to as basic preview data and eliminated preview data, respectively.

After the preview data has been generated, the printer graphics driver 43 notifies the OS 50 of completion of the process. The printer driver 40 generates the preview data corresponding to each physical sheet every time when the image data is received, which is repeated until the image data for the last page has been processed.

When the application program 61 has completed transmitting/receiving the print command of the last page, the application program 61 outputs an obtaining completion notification. When the obtaining completion notification is received from the application program 61, the OS 50 transmits a generation completion event to the user interface driver 41. The user interface driver 41 invokes the previewer 42 in response to receipt of the generation completion event.

The previewer 42 obtains all pieces of preview data generated by the printer graphics driver 43 immediately when or after invoked, and displays the top page of the preview image represented by the basic preview data in the image area 421. Thereafter, the previewer 42 switches the preview data displayed in the image area 421 from the one represented by the basic preview data to a preview image represented by the eliminated preview data when the eliminate button 426 is clicked with the basic preview data being displayed in the image area 421. When the non-elimination button 429 is clicked when the eliminated preview data is displayed, the previewer 42 switches the preview data displayed in the image area 421 from the eliminated preview data to the basic preview data.

When the print instruction of the user is received with the basic preview data being displayed, the previewer 42 generates print data based on the basic preview data. When the print instruction is received with the eliminated preview data being displayed, the previewer 42 generates the print data based on the eliminated preview data. Then, the previewer 42 transmits the generated print data to the printer 2. That is, in accordance with the print preview method, the previewer 42 transmits the print data to the print data in response to receipt of the print instruction by the user. If the cancel instruction by the user is received, the previewer 42 stops the print job.

<Preview Display Process>

Figure 6:
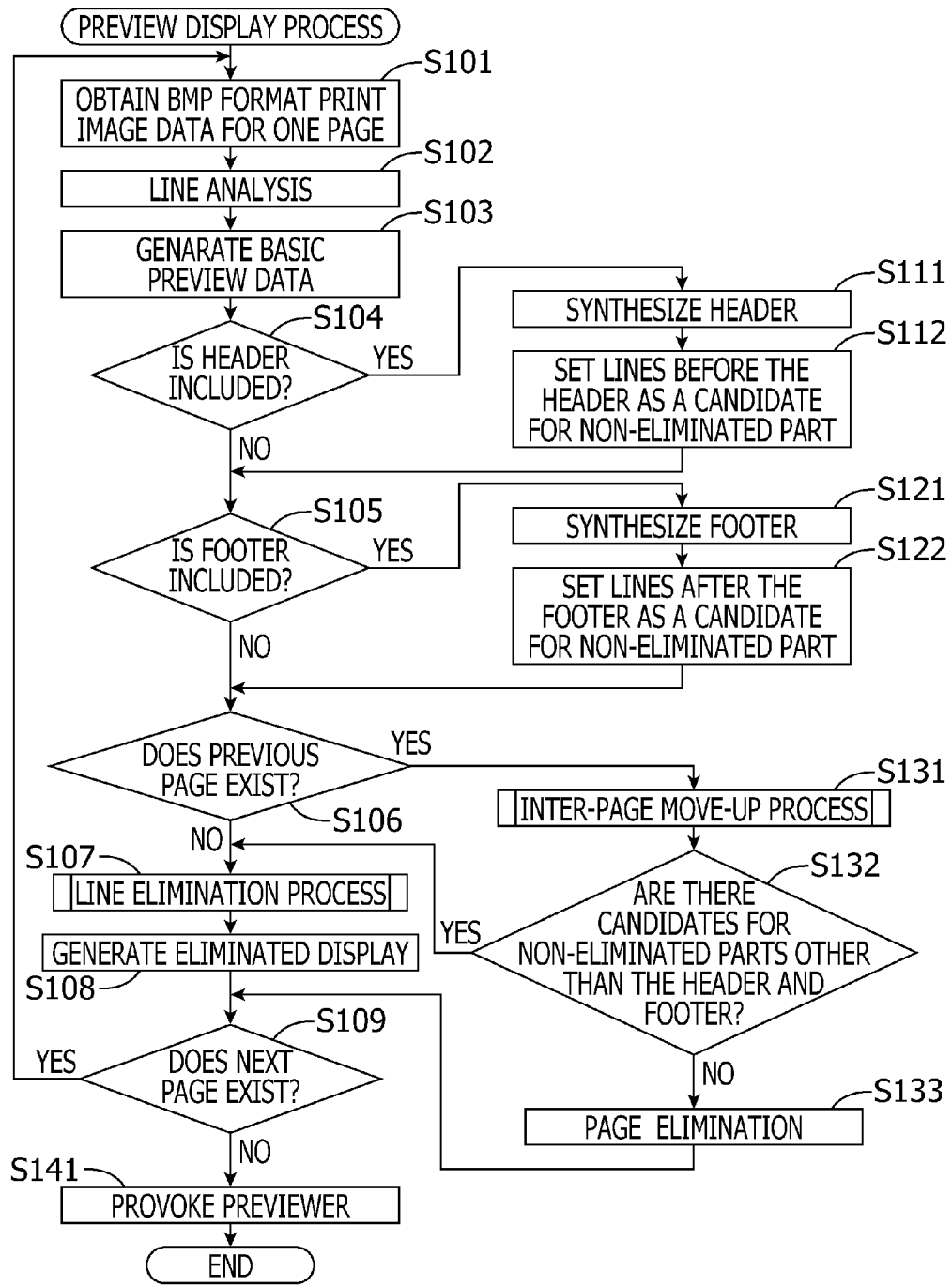
FIG. 6 is a flowchart illustrating a preview display process executed by a printer driver according to aspects of the illustrative embodiment.

FIG. 6 is a flowchart illustrating a preview display process according to the print preview method. The preview display process is executed by the CPU 11 when the application program 61 has received the print instruction by the user when the preview function is effective.

In the preview display process, firstly, the CPU 11 obtains the image data representing the image subjected to be printed for first one page (S101). Specifically, in S101, the OS 50 generates the image formation command directed to the printer driver 40 in accordance with the draw command received from the application program 61, and transmits the draw command to the printer graphics driver 43. The printer graphics driver 43 generates the BMP data in accordance with the received draw command. In other words, in S101, the printer driver 40 obtains the image data of the BMP format.

Next, for each line of the image data to be printed, the CPU 11 determines whether the line is an object-including line which is a line that intersects with an image forming area corresponding to an object, or an object-excluding line which does not intersect with an image forming area of any object (S102). It is noted that when an object (e.g., text, figures, graphic symbols, images, etc.) is formed, a rectangular area is defined. The size of such a rectangular area is a minimum size for accommodating the object which is subjected to be printed. In S102, the determination is made, for example, by determining whether each line intersects with the rectangular area defining image formation area (i.e., accommodating the object subjected to be printed) based on the draw command when the CPU 11 obtains the image data and processes the same. Then, the CPU 11 stores information indicating whether each line is the elimination candidate area (i.e., the line which can be eliminated since the line does not intersect with the rectangular area defining an image formation area) or a non-elimination candidate area (i.e., the line which should not be eliminated since the line intersects with a rectangular area defining an image formation area). It is noted that, according to the illustrative embodiment, the object-excluding line will also be referred to as a blank line. After execution of S 102, the CPU 11 generates the basic preview file (S 103) based on the image data obtained in S 101.

In S104, the CPU 11 determines whether a header is set or not (S104). When the header is set (S104: YES), the CPU 11 incorporates the header with the image data obtained in S101 (S111). Then, the CPU 11 sets a range from the top line to the line on which the header is drawn as the non-elimination candidate range (S112).

After execution of S112 or when the header is not set (S104: NO), the CPU 11 determines whether a footer is set or not (S105). When the footer is set (S105: YES), the CPU 11 synthesizes the footer with the image data obtained in S101 (S121). Then, the CPU 11 sets a range from a line on which the footer is drawn and the last line of the page as the non-elimination candidate (S122).

After execution of S122 or when the footer is not set (S 105: NO), the CPU 11 determines whether there is a previous page (S 106). When there is a previous page (S 106: YES), an inter-page move-up process to move up a part of the present page (i.e., lines) to the previous page is executed (S131).

Figure 7:
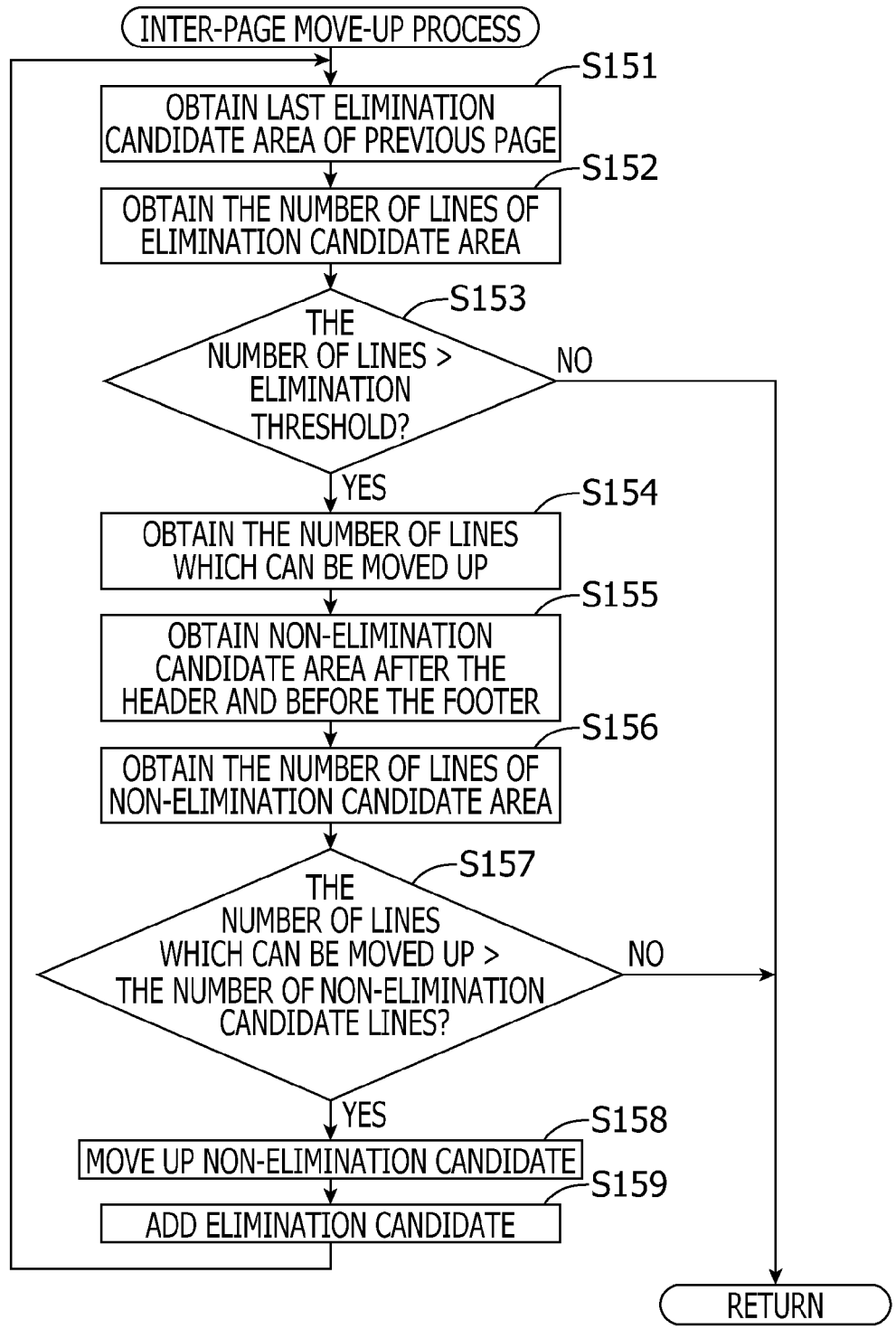
FIG. 7 is a flowchart illustrating an inter-page move-up process executed by the printer driver according to aspects of the illustrative embodiment.

The inter-page move-up process is illustrated in a flowchart shown in FIG. 7. In this process, the CPU 11 obtains the elimination candidate area which includes the last line before the footer of the previous page (S151). The elimination candidate area is an area which includes one or a plurality of consecutive lines all set as elimination candidate line(s).

In S152, the CPU 11 obtains the number of lines included in the elimination candidate areas obtained in S151. If the last line before the footer of the previous page is a non-elimination candidate line, the elimination candidate area is not obtained in S151. In such a case, the number of line obtained in S152 is zero.

Next, the CPU 11 judges whether the number of lines of the elimination candidate area obtained in S152 is greater than the elimination threshold value in S153. The elimination threshold has been set to provide an appropriate clearance between objects. That is, if an elimination candidate area consisting of the number of lines which is equal to or less than the elimination threshold value is deleted, objects may appear too close to each other and may deteriorate the appearance of the objects. Therefore, if the number of lines of the elimination candidate area is not greater than the elimination threshold value (S153: NO), the lines cannot be moved up to the previous page. In this case, the inter-page move-up process is terminated. It is noted that the elimination threshold value may be a fixed value, or a variable value which can be changed by a user setting or the like. For example, if the elimination threshold value is set to zero or if the elimination threshold is not employed, all the elimination candidate lines are eliminated.

When the number of lines of the elimination candidate area is greater than the elimination threshold value (S153: YES), the CPU 11 obtains the number of lines which can be moved up to the previous page (S154). Specifically, the number of lines which can be moved up to the previous page is the number calculated by subtracting the elimination threshold value from the number of lines obtained in S152. Thereafter, the CPU 11 obtains a first non-elimination candidate area in the current page at a position after the header and before the footer (S155). It is noted that the non-elimination candidate area is an area including one or a plurality of continuous lines which are designated as non-elimination candidate line(s).

After execution of S155, the CPU 11 obtains, in S156, the number of lines of the non-elimination candidate lines obtained in S155. It is noted that if there are no objects other than the header or footer in the current page, no non-elimination area is obtained in S155, and the number of lines obtained in S156 is zero.

In S157, the CPU 11 determines whether the number of lines which is obtained in S154 and can be moved up is greater than the number of lines obtained in S156 and representing the non-elimination candidate area. When the number of lines which can be moved up is greater than the number of lines of the non-elimination candidate area (S157: YES), the non-elimination candidate area is moved up to the previous page (S158). That is, the non-elimination candidate area obtained in S156 is copied at a position away from the last elimination candidate area of the previous page by the amount corresponding to the elimination threshold value.

After execution of S158, the CPU 11 changes the lines consisting of the non-elimination candidate area obtained in S155 to blank lines and sets the same as the elimination candidate area (S159). Thereafter, the CPU 11 returns to S151, and repeats the same process until none of the non-elimination candidate areas of the current page can be moved up to the previous page. When the number of lines which can be moved up to the previous page is not greater than the number of lines of the non-elimination candidate area (S157: NO), that is, when the top of the non-elimination candidate area of the current page cannot be moved up to the elimination candidate area of the previous page, the inter-page move-up process is terminated.

After execution of S131 (FIG. 6), the CPU 11 determines whether the current page includes a non-elimination candidate other than an area before the header and an area after the footer (S132). If there is no other non-elimination candidate area (S132: NO), the CPU 11 deletes the current page (S133) since the current page does not include a substantial image subjected to be printed.

If there is a non-elimination candidate area (S132: YES), or if the previous page does not exit (S106: NO), the CPU 11 executes a line elimination process to eliminate the elimination candidate lines in the current page (S107).

Figure 8:
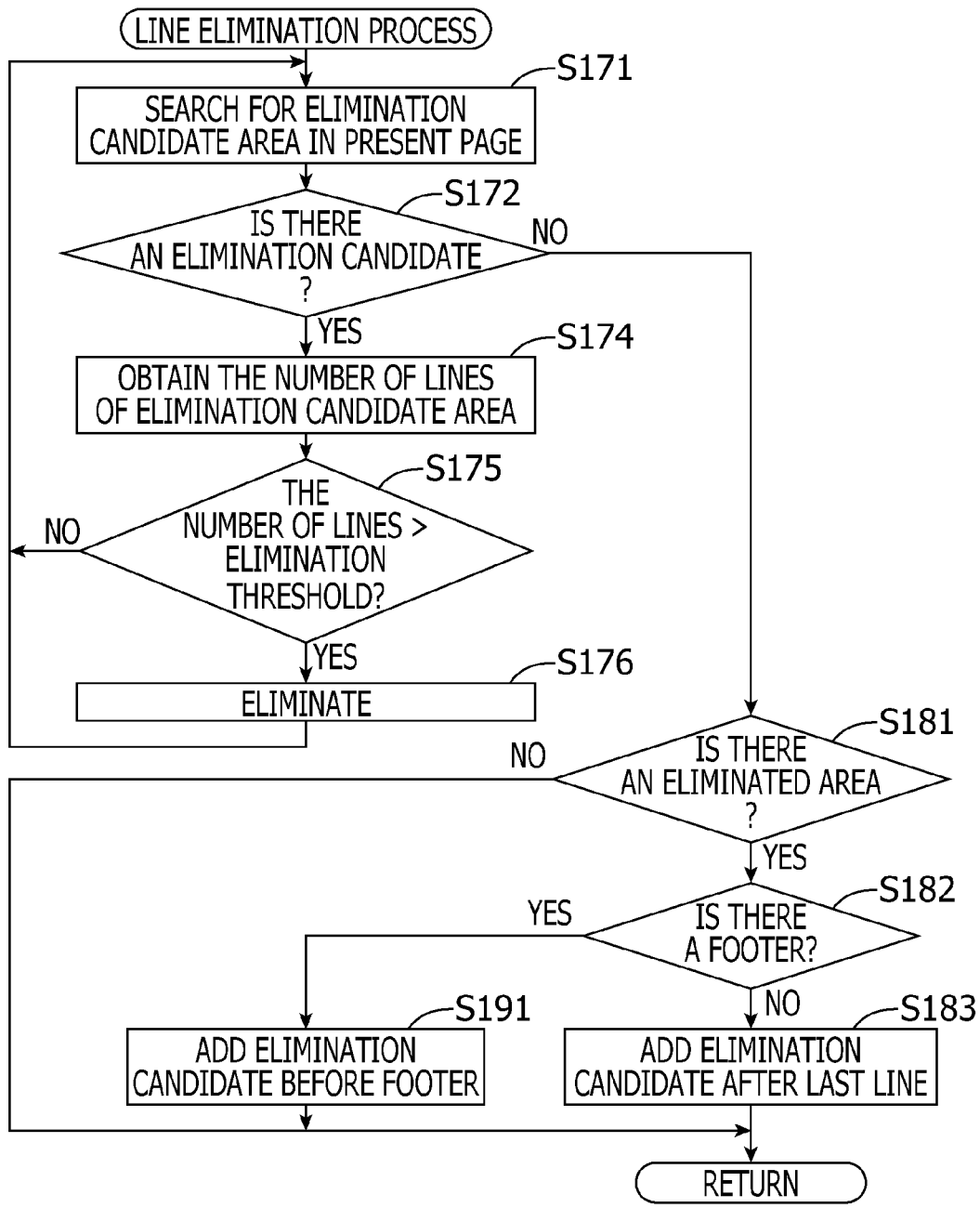
FIG. 8 is a flowchart illustrating a line elimination process executed by the printer driver according to aspects of the illustrative embodiment.

When the line elimination process is started, as shown in FIG. 8, the CPU 11 starts searching for an elimination candidate area from the top of the current page (S171). If an elimination candidate area is found (S172: YES), the CPU 11 obtains the number of lines of the elimination candidate area as searched (S174). Then, the CPU 11 determines whether the number of lines obtained in S174 is greater than the elimination threshold value (S175). It is noted that the elimination threshold value referred to in S175 is the same as that referred to in S153.

When the number of lines of the elimination candidate area is greater than the elimination threshold value (S175: YES), the CPU 11 eliminates lines of the elimination candidate area searched in S171 by the amount (i.e., the number of lines) which is calculated by subtracting the elimination threshold value from the number of lines included in the elimination candidate area, and moves up the lines after the eliminated lines (S176). At this stage, in accordance with decrease of the number of lines by the elimination, information indicating whether each line of the image is the elimination candidate line or the non-elimination candidate line is updated. It is noted that the lines to be eliminated in S176 may be any lines included in the elimination candidate area. That is, the lines apart from the first line in the elimination candidate area by the threshold value may be eliminated, or the line apart from the last line in the elimination candidate area by the threshold value may be eliminated. Alternatively, the lines at a central part (i.e., apart from both the first and last lines) may be eliminated as far as lines corresponding to the number of lines equal to the threshold value are retained. After execution of S176, or when the number of lines of the elimination candidate area is not greater than the elimination threshold value (S175: NO), the CPU 11 returns to S171 and searches for the next elimination candidate area.

When the elimination candidate area has not been found (S172: NO), the CPU 11 determines whether an elimination candidate area has been eliminated (S181). If the CPU 11 has proceeded to S181 without eliminating an elimination candidate area (S181: NO), there is no change in the image of the current page, and the line elimination process is terminated.

If the CPU 11 has eliminated the lines in an elimination candidate area (S181: YES), the CPU 11 determines whether there is a footer on the current page (S182). If there is not a footer on the current page (S182: NO), the CPU 11 adds blank lines corresponding to the total number of lines eliminated from the current page in S176 after the last line of the current page, and sets the added lines as elimination candidate lines (S183). That is, blank lines corresponding to the eliminated lines from the current page are added after the last line of the current page in order to maintain the size (i.e., the number of lines) of the current page. If there is a footer on the current page (S182: YES), the CPU 11 adds blank lines corresponding to the total number of lines eliminated from the current page in S176 immediately before the footer, and sets the added lines as the elimination candidate lines (S191). After execution of S183 or S191, the CPU 11 terminates the line elimination process.

After execution of S107 (FIG. 6), the CPU 11 generates elimination preview data based on the image data to which elimination has been applied (S108). After execution of S108 or S133, the CPU 11 determines whether there exists a next page (S109). When the next page exists (S109: YES), the CPU 11 proceeds to S101 and executes processes for the next page.

If the next page does not exist (S109: NO), the CPU 11 invokes the previewer 42 in S142 since the processes from top page to the last page have been completed. As an initial process, the previewer 42 retrieves the basic preview data generated in S103 and the elimination preview data generated in S108 and displays the top page of the basic preview data in the image area 421. After execution of S141, the preview display process is terminated.

<Print Process>

Figure 9:
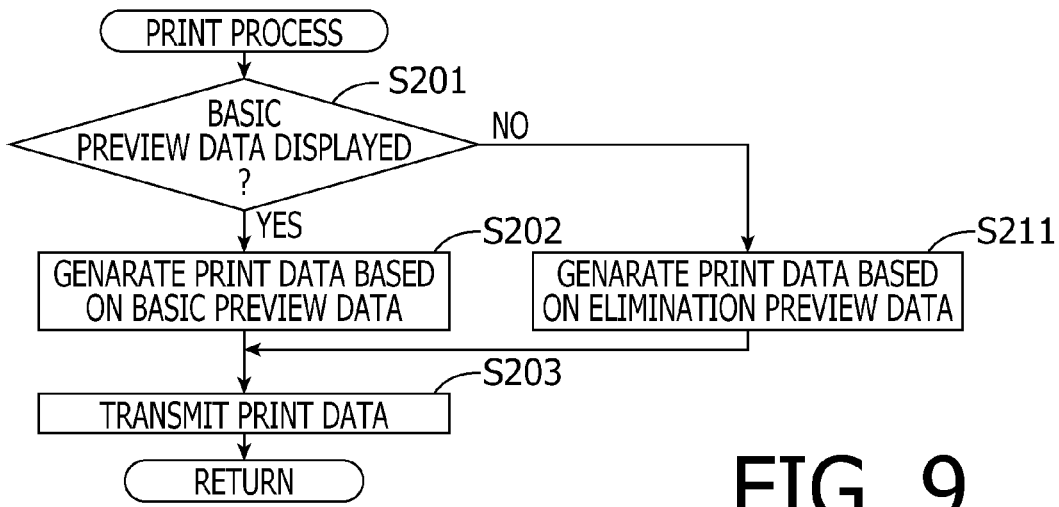
FIG. 9 is a flowchart illustrating a print process executed by the printer driver according to aspects of the invention.

Next, a print process executed by the PC 1 realizing a printing process according to the print preview method described above will be described, referring to the flowchart shown in FIG. 9. It is noted that the print process shown in FIG. 9 is executed by the CPU 11 when a print start button 423 of the previewer 42 is clicked.

When the print process is started, the CPU 11 firstly determines whether the preview data currently being displayed on the previewer 42 is the basic preview data or not (S201). As described above, in the previewer 42, displayed data can be switched between the basic preview data and the elimination preview data. Therefore, the image subjected to be printed is determined in this step.

When the basic preview data is being displayed (S201: YES), the CPU 11 generates the print data based on the basic preview data (S201). When the basic preview data is not being displayed (S201: NO), that is, when the elimination preview data is being displayed, the CPU 11 generates the print data based on the elimination preview data (S211).

After execution of S202 or S211, the CPU 11 transmits the generated print data to the printer 2 (S203), and terminates the print process. In response to the receipt of the print data, the printer 2 executes printing based on the received print data.

As described above, with use of the printer driver 40 according to the aspect of the illustrative embodiment, it is examined whether each line of the image data subjected to be printed is the object-including line data or object-excluding line data.

Then, by eliminating the object-excluding line data and retaining the object-including line data, the elimination preview data is generated. With this process, the blank lines have been deleted without eliminating parts of the object. As a result, it is expected that deletion of blank lines which the user does not intend to delete becomes avoidable.

<Highlight Display Process>

Figure 10:
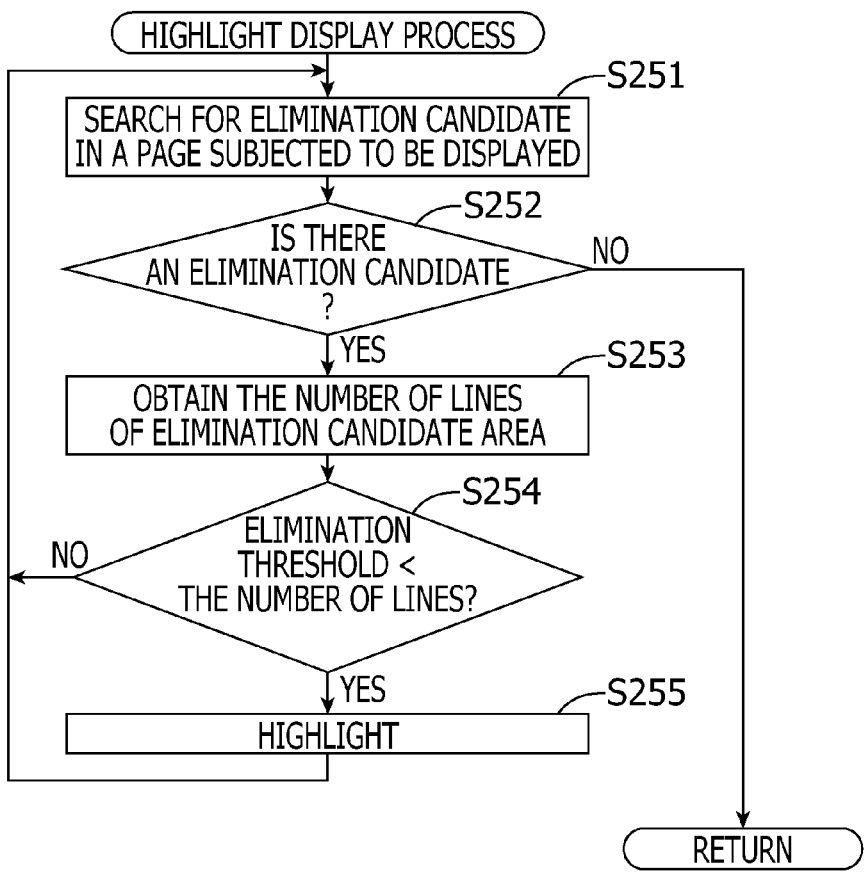
FIG. 10 is a flowchart illustrating a highlight display process executed by a previewer according to aspects of the illustrative embodiment.

Next, a highlight display process executed by the previewer 42 will be described with reference to a flowchart shown in FIG. 10. The highlight display process is invoked by the CPU 11 in response to depression of a highlight button 425 displayed on the previewer 42.

When the highlight display process is started, the CPU 11 searches for an elimination candidate area from the top of the page subjected to be displayed (S251), and determines whether an elimination candidate is found (S252).

When the elimination candidate are is found (S252: YES), the CPU 11 obtains the number of lines of the elimination candidate area (S253). The CPU 11 then determines whether the number of lines of the elimination area is greater than the elimination threshold value (S254). It is noted that the elimination threshold value used in S254 is the same as that used in S153.

When the number of the lines included in the elimination candidate area is greater than the elimination threshold value (S254: YES), the CPU 11 displays a portion of the elimination candidate area corresponding to the lines the number of which is a difference between the number of lines included in the elimination candidate area and the elimination threshold value in a highlighted manner (S255). It is noted that the lines to be highlighted in S255 may be any lines as far as the lines are included in the elimination candidate area. That is, the lines apart from the first line in the elimination candidate area by the threshold value may be highlighted, or the line apart from the last line in the elimination candidate area by the threshold value may be highlighted. Alternatively, the lines at a central part (i.e., apart from both the first and last lines) may be highlighted as far as lines corresponding to the number of lines equal to the threshold value are retained un-highlighted. It is noted that consecutive lines may be highlighted, a plurality of discontinuous lines may be highlighted, or the highlighted lines may include both.

After execution of S255 or when the number of lines of the elimination candidate area is not greater than the elimination threshold value (S254: NO), the CPU 11 returns to S251 and searches for a next elimination candidate area. When no elimination candidate area has not been found (S252: NO), the CPU 11 terminates the highlight display process.

As described in detail above, the previewer 42 according to aspects of the illustrative embodiment is configured to display the elimination candidate areas in highlighted manner, thereby the lines in the elimination candidate areas and lines in the non-elimination candidate areas are displayed distinctively. Therefore, a user can recognize the lines (areas) subjected to be eliminated easily.

It is noted that the illustrative embodiment described above is only an exemplary one and is not intended to limit the scope of the disclosures. The aspects of the disclosures can be modified in various ways without departing from the scope thereof. For example, a copier, a facsimile machine, an MFP (multi-function peripheral) having a printing function as well as the printer can be regarded as a printing device. Further, a workstation, a smart phone, a PDF (personal digital assistance) as well as the PC can be regarded as an information processing apparatus.

In the illustrative embodiment described above, the previewer 42 is described to be included in the printer driver 40. However, in view of displaying the preview data, the previewer need not be a dedicated module for the printer driver 40, but any module which merely has a function of processing the preview data. For example, if the data format of the preview data is BMP, a viewer program provided by the OS 50 may be used to display the preview data.

According the above-described illustrative embodiment, when the print preview method is used, both the basic preview data and the elimination preview data are generated before the previewer 42 is invoked. This can be modified such that only the basic preview data is generated before the previewer 42 is invoked, and the elimination preview data may be generated in response to depression of the elimination button 426.

In the above-described illustrative embodiment, when the print preview method is used, the preview data is firstly displayed with the previewer 42, the previewer 42 generates the print data in response to depression of the print button 423. This configuration may be modified such that the print data may be generated by the printer graphics driver 43. In this case, for example, the printer graphics driver 43 receives a print data generation command designating an eliminating range from the previewer 42, and generates the print data based on the received print data generation command. In other words, when it is stated that the previewer 42 generates the print data, it could be interpreted to include a case where the previewer 42 causes another program (e.g., the printer graphics driver 43) to generate the print data instead of generating the print data by itself. Alternatively, the printer graphics driver 43 may be configured to generate two pieces of print data respectively corresponding to the basic preview data and the elimination preview data during the preview displaying process, and the previewer 42 may retrieve the print data corresponding to the displayed preview data and transmit the same to the printer when the printing process is executed.

According to the above-described illustrative embodiment, the preview data is displayed by one page. This configuration may be modified to display a plurality of pages at a time. Additionally or optionally, the embodiment may be modified such that enlargement and/or reduction of the displayed preview data is available.

According the illustrative embodiment, the preview data is BMP data or a compressed format of the BMP data (e.g., JPEG data). It is not necessary to limit the data format to the above formats and any other type of data such as XML (extended markup language) data, PDF (portable data document format) data or the like may be employed alternatively or optionally.

According to the illustrative embodiment, for distinguishing the lines which could be an elimination candidate from the lines which could not be the elimination candidate, highlighting is employed. This configuration can be modified such that the elimination candidate area may be indicated by a rectangular frame (i.e., lines forming a rectangle) which surrounds the elimination candidate area.

According to the illustrative embodiment, the elimination candidate area is indicated on the preview image. This configuration may be modified to apply to a case where the image data is printed with eliminating blank lines without displaying the preview image. In such a case, for example, a print setting may be configured such that elimination of blank lines may be selected as one of print setting items, and print data with eliminating the blank lines may be generated when such an item is selected. Thus, the above-described configuration is applicable to a case where the print data is generated with eliminating blank lines.

What is claimed is:

1. A non-transitory computer-readable recording medium storing instructions which, when executed by a computer, provide processes including:
   receiving a print start instruction to print original image data representing an original image, the original image including a plurality of objects, the original image including a plurality of lines, each of the plurality of lines being represented by each line data included in the original image data;
   generating a draw command in accordance with the print start instruction and the original image data;
   determining, based on the draw command, a plurality of areas in which each of the plurality of objects are drawn, respectively, are plurality of rectangular areas;
   determining whether each line data is subjected to be printed across at least one of the plurality of rectangular areas;
   determining the line data is object-including line data when the line data is subjected to be printed across at least one of the plurality of rectangular areas;
   determining the line data is object-excluding line data when the line data is not subjected to be printed across at least one of the plurality of rectangular areas; and
   generating print data in accordance with the object-including line data and the object-excluding line data, the object-excluding line data being eliminated from the original image data.

2. The recording medium according to claim 1, wherein the instructions further cause the image processing device to execute a process of generating elimination preview image data to be displayed based on the original image data from which the object-excluding line data is eliminated.

3. The recording medium according to claim 2,
   wherein the processes further include:
       determining whether the draw command includes a setting of at least one of a footer and a header; and
       when determining that the draw command includes the setting of at least one of the footer and the header, generating the elimination preview image data including the at least one of the footer and the header such that the lines other than ones corresponding to the at least of the footer and the header are moved up.

4. The recording medium according to claim 2,
   wherein the generating the elimination preview image data generates image data with eliminating data for a page that contains only an area of a header or an area of a footer after the object-excluding line data have been eliminated from the page.

5. The recording medium according to claim 1,
   wherein the instructions further cause the image processing device to execute a process of:
   generating preview image data based on the original image data including the object-including line data and the object-excluding line data; and
   displaying the preview image data as generated, and
   wherein the displaying displays the object-excluding line data and the object-including line data in different manners.

6. A method of generating print data based on original image data, the method includes:
   receiving a print start instruction to print original image data representing an original image, the original image including a plurality of objects, the original image including a plurality of lines, each of the plurality of lines being represented by each line data included in the original image data;
   generating a draw command in accordance with the print start instruction and the original image data;
   determining, based on the draw command, a plurality of areas in which each of the plurality of objects are drawn, respectively, are plurality of rectangular areas;
   determining whether each line data is subjected to be printed across at least one of the plurality of rectangular areas;
   determining the line data is object-including line data when the line data is subjected to be printed across at least one of the plurality of rectangular areas;
   determining the line data is object-excluding line data when the line data is not subjected to be printed across at least one of the plurality of rectangular areas; and
   generating print data in accordance with the object-including line data and the object-excluding line data, the object-excluding line data being eliminated from the original image data.

7. A non-transitory computer-readable recording medium storing instructions which, when executed by a computer, provide processes including:
   receiving a print start instruction to print original image data representing an original image, the original image including a plurality of objects, the original image a plurality of lines, each of the plurality of lines being represented by each line data included in the original image data;

generating a draw command in accordance with the print start instruction and the original image data;

determining, based on the draw command, a plurality of areas in which each of the plurality of objects are drawn, respectively, are a plurality of rectangular areas;

determining whether each line data is subjected to be printed across at least one of the plurality of rectangular areas;

determining the line data is object-including line data when the line data is subjected to be printed across at least one of the plurality of rectangular areas;

determining the line data is object-excluding line data when the line data is not subjected to be printed across at least one of the plurality of rectangular areas;

determining whether a plurality of successive line data, which are the object-excluding line data, are included in the original image data;

determining whether a number of a plurality of successive object-excluding lines being represented by the plurality of successive object-excluding line data is greater than a specific elimination threshold when the plurality of successive object-excluding line data are included in the original image data;

determining at least part of the plurality of successive object-excluding lines to be eliminated from the original image data when the number of the plurality of successive object-excluding line data is greater than a specific elimination threshold; and generating print data in accordance with the object-including line data and the object-excluding line data, the object-excluding line data of the determined at least part of the plurality of successive object-excluding lines being eliminated from the original image data.

8. The recording medium according to claim 7, wherein the number of the determined at least part of the plurality of successive object-excluding lines being eliminated from the original image data, when the generating the print data generates the print data, is the number of lines of the plurality of successive object-excluding lines exceeding the specific elimination threshold.

9. The recording medium according to claim 2, wherein the processes further include:
  determining, when object-excluding line data is eliminated from one page, whether a rectangular area in which an object is drawn firstly appearing on a page subsequent to the one page can be incorporated in the one page; and
  generating the elimination preview image data in which the rectangular area firstly appearing on the page subsequent to the one page is moved to the one page when it is determined that the rectangular area firstly appearing on the page subsequent to the one page can be incorporated in the one page.

10. The recording medium according to claim 1, wherein the processes further include:
  determining whether a plurality of successive line data, which are the object-excluding line data, are included in the original image data;
  determining whether a number of the plurality of successive object-excluding lines being represented by the plurality of successive object-excluding line data is greater than a specific elimination threshold when a plurality of successive object-excluding line data are included in the original image data;
  determining at least part of the plurality of successive object-excluding lines to be eliminated from the original image data when the number of the plurality of successive object-excluding line data is greater than a specific elimination threshold; and
  generating print data by eliminating the determined object-excluding line data of the plurality of successive object-excluding lines from the original image data.

11. The recording medium according to claim 1, wherein the processes further include:
  generating basic preview image data based on the draw command, the basic preview image data including the object-including line data and the object-excluding line data; and
  displaying the generated basic preview image data.

12. The recording medium according to claim 11, wherein the processes further include:
  generating elimination preview image data by eliminating the object-excluding line data from the basic preview image data; and
  in response to receipt of a switching operation, switching preview image data to be displayed between the basic preview image data and the elimination preview image data.

13. The recording medium according to claim 11, wherein the processes further include:
  generating elimination preview image data by eliminating the object-excluding line data from the basic preview image data;
  displaying the basic preview image data and the elimination preview image data, alternatively;
  in response to receipt of a print instruction when displaying the basic preview image data, generating print data based on the basic preview image data; and
  in response to receipt of the print instruction when displaying the elimination preview image data, generating print data based on the elimination preview image data.

14. The recording medium according to claim 1, wherein the processes further include:
  determining whether the draw command includes a setting of a footer;
  when determining that the draw command includes the setting of the footer, generating print data by eliminating the object-excluding line data from the original image data and adding blank lines before the footer; and
  when determining that the draw command does not include the setting of the footer, generating print data by eliminating the object-excluding line data from the original image data and adding blank lines after a last line of object-including lines indicated by the object-including line data.

15. A non-transitory computer-readable recording medium storing instructions which, when executed by a computer, provide processes including:
  receiving a print start instruction to print original image data representing an original image, the original image including a plurality of objects, the original image including a plurality of lines, each of the plurality of lines being represented by each line data included in the original image data;
  generating a draw command to generate preview image data in accordance with the print start instruction and the original image data;

determining, based on the draw command, a plurality of areas in which each of the plurality of objects are drawn, respectively, are a plurality of rectangular areas;

determining whether each line data is subjected to be printed across at least one of the plurality of rectangular areas;

determining the line data is object-including line data when the line data is subjected to be printed across at least one of the plurality of rectangular areas;

determining the line data is object-excluding line data when the line data is not subjected to be printed across at least one of the plurality of rectangular areas; and generating elimination preview image data to be displayed based on the original image data from which the object-excluding line data is eliminated.

* * * * *